United States Patent
Hahn et al.

(10) Patent No.: US 10,558,376 B2
(45) Date of Patent: Feb. 11, 2020

(54) STORAGE SYSTEM AND METHOD FOR NAMESPACE RESERVATION IN A MULTI-QUEUE SINGLE-CONTROLLER ENVIRONMENT

(71) Applicant: Western Digital Technologies, Inc., San Jose, CA (US)

(72) Inventors: Judah Gamliel Hahn, Ofra (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/021,813

(22) Filed: Jun. 28, 2018

(65) Prior Publication Data
US 2020/0004441 A1    Jan. 2, 2020

(51) Int. Cl.
*G06F 3/06* (2006.01)
*G06F 13/40* (2006.01)
*G06F 13/16* (2006.01)

(52) U.S. Cl.
CPC .......... *G06F 3/0622* (2013.01); *G06F 3/0631* (2013.01); *G06F 3/0659* (2013.01); *G06F 3/0673* (2013.01); *G06F 13/1668* (2013.01); *G06F 13/4022* (2013.01)

(58) Field of Classification Search
CPC .... G06F 3/0622; G06F 3/0631; G06F 3/0659; G06F 3/0673; G06F 13/1668; G06F 13/4022
See application file for complete search history.

(56) References Cited

U.S. PATENT DOCUMENTS

| | | | |
|---|---|---|---|
| 9,003,071 B2 | 4/2015 | Liu | |
| 9,268,717 B2 | 2/2016 | Kanigicheria et al. | |
| 10,007,443 B1* | 6/2018 | Rajadnya | G06F 3/0613 |
| 2009/0036098 A1* | 2/2009 | Lee | H04W 48/20 455/411 |
| 2014/0201419 A1 | 7/2014 | Ayzenfeld et al. | |
| 2015/0134857 A1* | 5/2015 | Hahn | G06F 3/061 710/5 |
| 2016/0366229 A1 | 12/2016 | Yamaura et al. | |
| 2017/0024166 A1* | 1/2017 | Singh | G06F 12/0246 |
| 2017/0102874 A1* | 4/2017 | Ouchi | G06F 3/061 |

(Continued)

OTHER PUBLICATIONS

NVM Express et al., "NVM Express 1.3 1 NVM Express" dated May 1, 2017. (Year: 2017).*

(Continued)

*Primary Examiner* — Ramon A. Mercado
(74) *Attorney, Agent, or Firm* — Brinks Gilson & Lione (57) ABSTRACT

A storage system and method for namespace reservation in a multi-queue single-controller environment are provided. In one embodiment, a method for access control in a memory is performed in a storage system comprising a memory and a controller in communication with a plurality of hosts, wherein each host comprises its own set of input-output queues but only one host comprises an admin queue. The method comprises receiving a mapping that restricts access to portions of the memory to specific ones of the plurality of hosts, wherein the mapping is generated by the host that comprises the admin queue; and restricting access to the portions of the memory based on the mapping. Other embodiments are provided.

18 Claims, 6 Drawing Sheets

(56) References Cited

U.S. PATENT DOCUMENTS

2017/0149920 A1* 5/2017 Sammatshetti ..... H04L 67/2842
2018/0032471 A1   2/2018 Olarig
2018/0063145 A1* 3/2018 Cayton ................ H04L 63/101
2018/0275872 A1* 9/2018 Benisty ................ G06F 3/061
2018/0275905 A1* 9/2018 Olarig ................ G06F 13/4282

OTHER PUBLICATIONS

NVM Express et al., "NVM Express 1.3 1 NVM Express" dated May 1, 2017, XP055581807, retrieved from the Internet, on Apr. 17, 2019, at URL: <https://nvmexpress.org/wp-content/uploads/NVM_Express_Revision_1.3pdf>.
International Search Report and Written Opinion in International Application No. PCT/US2019/017849, dated Apr. 29, 2019, 18 pages.

* cited by examiner

STORAGE SYSTEM AND METHOD FOR NAMESPACE RESERVATION IN A MULTI-QUEUE SINGLE-CONTROLLER ENVIRONMENT

BACKGROUND

In some environments, it is desired to restrict access to certain areas in the memory of a storage system while providing shared access to other areas in the memory. The Non-Volatile Memory Express (NVMe) protocol can be used to accomplish this. In a typical NVMe environment, a single host is used with a single storage system having a controller and a memory. The storage system can implement a plurality of virtual NVMe controllers that communicate with the controller of the storage system. NVMe provides the concept of "namespace reservation" to restrict access of certain namespaces (i.e., collections of logical blocks in memory) to certain virtual NVMe controllers. A private namespace is an area of memory that is only accessible by an authorized virtual NVMe controller, whereas a shared namespace is an area of memory that is accessible by all of the virtual NVMe controllers. The host can instruct the storage system as to which virtual NVMe controllers are authorized to access the various namespaces.

DETAILED DESCRIPTION

Overview

By way of introduction, the below embodiments relate to a storage system and method for namespace reservation in a multi-queue single-controller environment. In one embodiment, a method for access control in a memory is provided. The method is performed in a storage system comprising a memory and a controller in communication with a plurality of hosts, wherein each host comprises its own set of input-output queues but only one host comprises an admin queue. The method comprises receiving a mapping that restricts access to portions of the memory to specific ones of the plurality of hosts, wherein the mapping is generated by the host that comprises the admin queue; and restricting access to the portions of the memory based on the mapping.

In some embodiments, the mapping is sent to the storage system from one of the plurality of hosts that does not comprises the admin queue.

In some embodiments, the mapping is based on command identifiers of the plurality of hosts.

In some embodiments, the mapping is based on identifiers of the queues.

In some embodiments, the memory comprises a three-dimensional memory.

In some embodiments, the memory further comprises a portion that is accessible by the plurality of hosts.

In some embodiments, the storage system comprises a solid state drive (SSD).

In some embodiments, the storage system and the plurality of hosts are part of an automobile.

In another embodiment, a system is provided comprising a first host comprising a first set of input-output queues and an admin queue; a second host comprising a second set of input-output queues but not an admin queue; a storage system comprising a controller and a memory; and a switch configured to allow communication between the first host, the second host, and the storage system. The first host is configured to create an association between the first set of input-output queues and a first namespace in the memory of the storage system and between the second set of input-output queues and a second namespace in the memory.

In some embodiments, the association is sent to the storage system from one of the first and second set of input-output queues.

In some embodiments, the first host is further configured to receive a command identifier from the second host and use the command identifier to create the association between the second set of input-output queues and the second namespace in the memory.

In some embodiments, the first set of input-output queues and the second set of input-output queues are associated with respective identifiers, and wherein the first host is configured to create the association using the respective identifiers.

In some embodiments, the memory comprises a three-dimensional memory.

In some embodiments, the memory further comprises a namespace that is shared by the first and second hosts.

In some embodiments, the storage system comprises a solid state drive (SSD).

In some embodiments, the storage system and the first and second hosts are part of an automobile.

In another embodiment, a host is provided comprising a first set of input-output queues; an admin queue; an interface through which to communicate with a storage system comprising a controller and a memory and with a second host comprising a second set of input-output queues, wherein the second host shares the admin queue of the host; and means for creating an association between the first set of input-output queues and a first namespace in the memory of the storage system and between the second set of input-output queues and a second namespace in the memory.

In some embodiments, the memory comprises a three-dimensional memory.

In some embodiments, the storage system comprises a solid state drive (SSD).

In some embodiments, the host is part of an automobile.

Other embodiments are possible, and each of the embodiments can be used alone or together in combination. Accordingly, various embodiments will now be described with reference to the attached drawings.

EMBODIMENTS

Figures 1A, 1B:
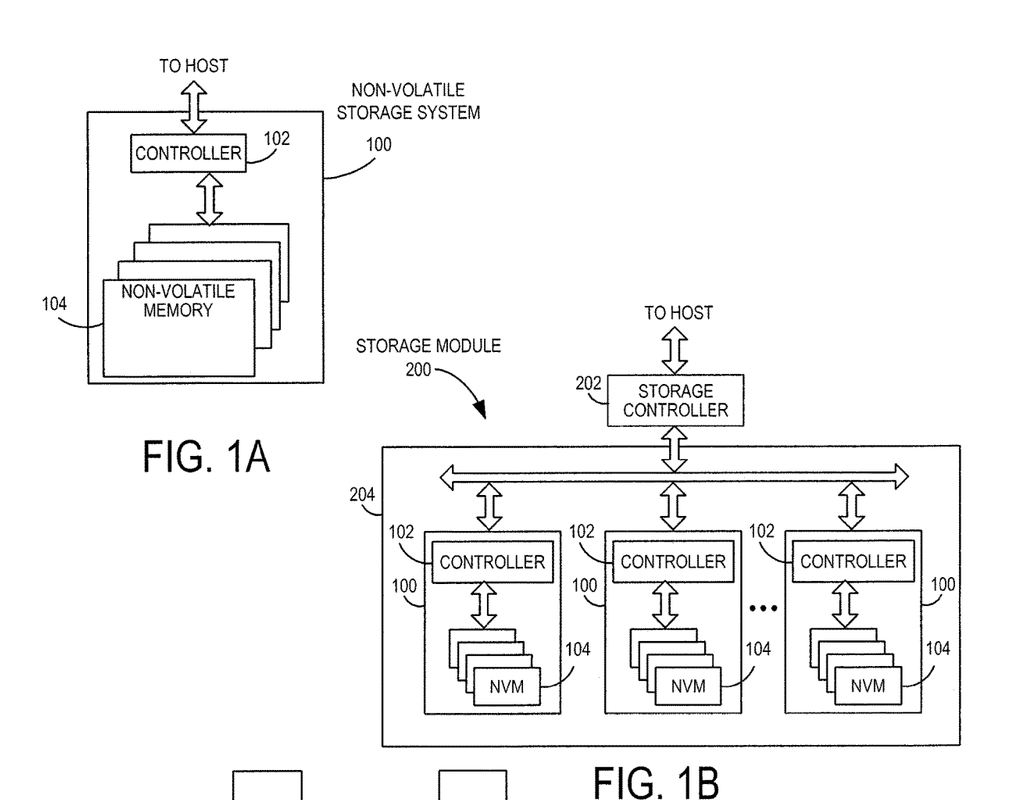
FIG. 1A is a block diagram of a non-volatile storage system of an embodiment.
FIG. 1B is a block diagram illustrating a storage module of an embodiment.
Figure 1C:
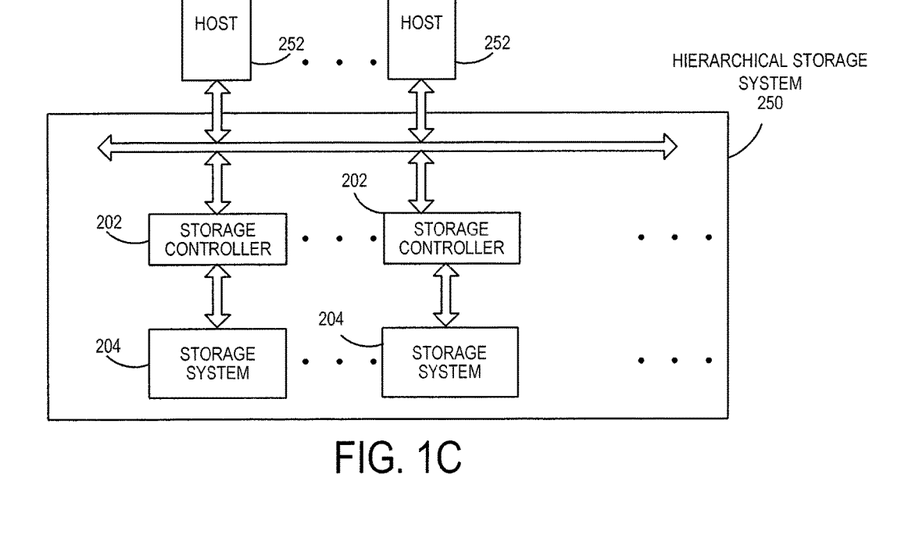
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), magnetoresistive random-access memory (MRAM), phase-change memory (PCM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or dual-date-rate (DDR) interface. Storage module 200, in one embodiment, may be a solid state drive (SSD), or non-volatile dual in-line memory module (NVDIMM), such as found in server personal computer (PC) or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
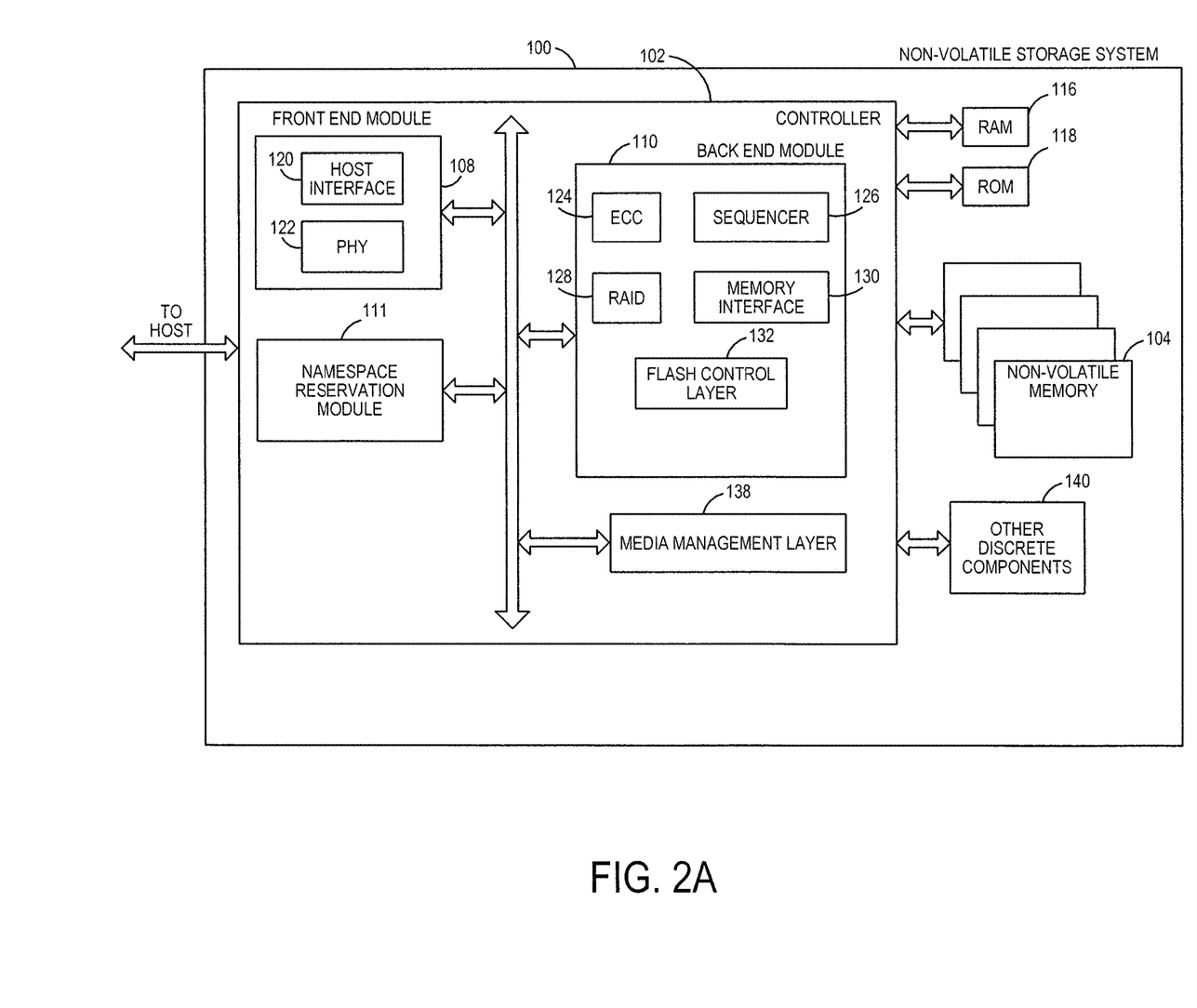
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a namespace reservation module 111, which will be discussed in more detail below and can be implemented in hardware or software/firmware to perform the algorithms and methods discussed herein and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, serial advanced technology attachment (SATA), SATA Express, serially-attached small computer system interface (SAS), Fibre Channel, universal serial bus (USB), peripheral component interface express (PCIe), and Non-Volatile Memory Express (NVMe). The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A Redundant Array of Independent Drives (RAID) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
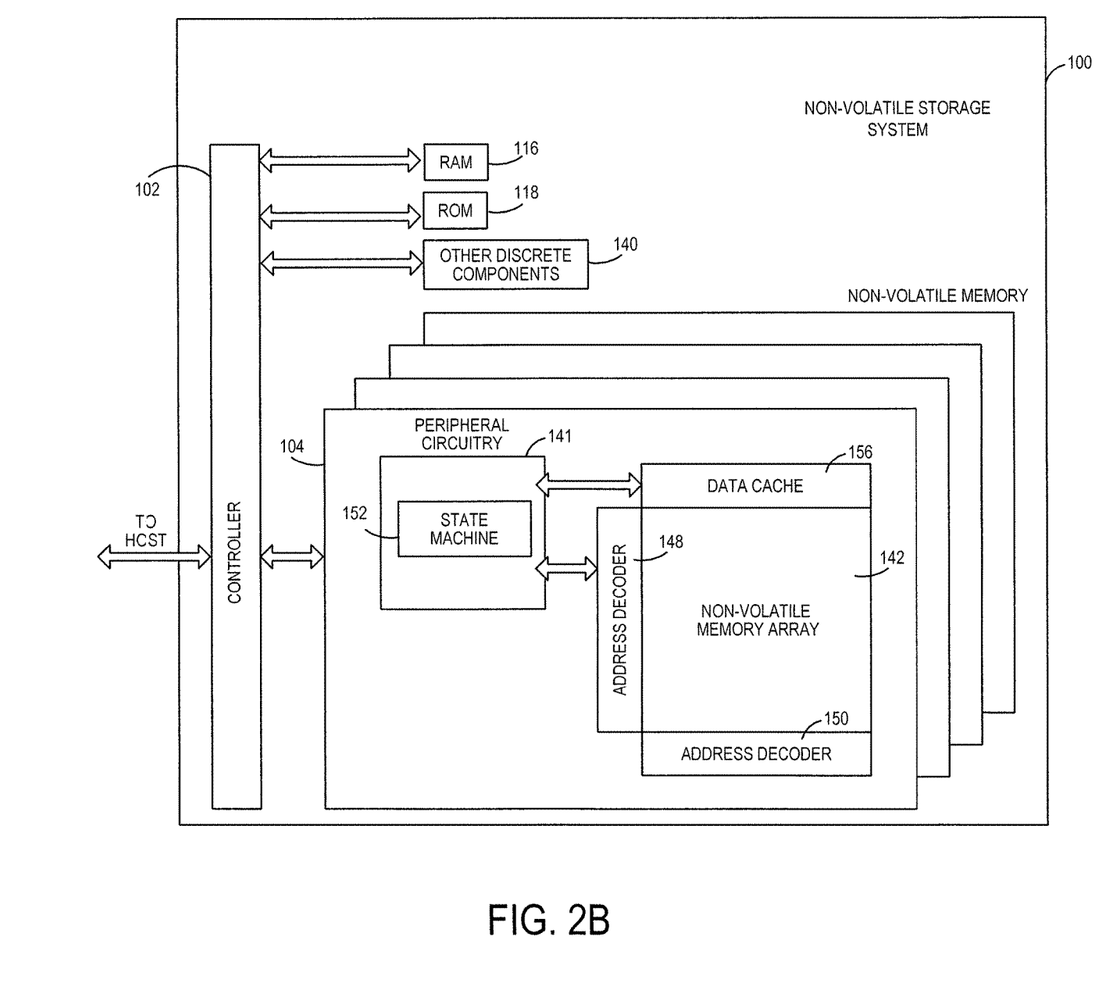
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

As mentioned in the background section above, in some environments, it is desired to restrict access to certain areas in the memory of a storage system while providing shared access to other areas in the memory. The Non-Volatile Memory Express (NVMe) protocol can be used to accomplish this. In a typical NVMe environment, a single host is used with a single storage system having a controller and a memory. The storage system can implement a plurality of virtual NVMe controllers that communicate with the controller of the storage system. NVMe provides the concept of "namespace reservation" to restrict access of certain namespaces (i.e., collections of logical blocks in memory) to certain virtual NVMe controllers. A private namespace is an area of memory that is only accessible by an authorized virtual NVMe controller, whereas a shared namespace is an area of memory that is accessible by all of the virtual NVMe controllers. The host can instruct the storage system as to which virtual NVMe controllers are authorized to access the various namespaces.

While the NVMe protocol assumes a one-to-one relationship between the host and the controller of the storage system, in some environments (e.g., in automobiles), the controller of the storage system may be expected to serve multiple hosts. In such environments, a single storage system may be expected to hold multiple namespaces, each of which store data relevant to a different virtual or physical host (e.g., within the automobile's autonomous driving, infotainment, or data logging subsystems). While the NVMe specification includes a feature called "reservations," which allows arbitration of a shared namespace between multiple NVMe controllers, this feature may be used with multiple virtual controllers (such as via single root I/O virtualization (SR-IOV)) and is not easily ported to an environment with a single shared controller and multiple hosts. The following embodiments can be used to leverage reservation semantics but extend the concept to a single-controller environment by associating reservations with queues rather than controllers.

Figure 3:
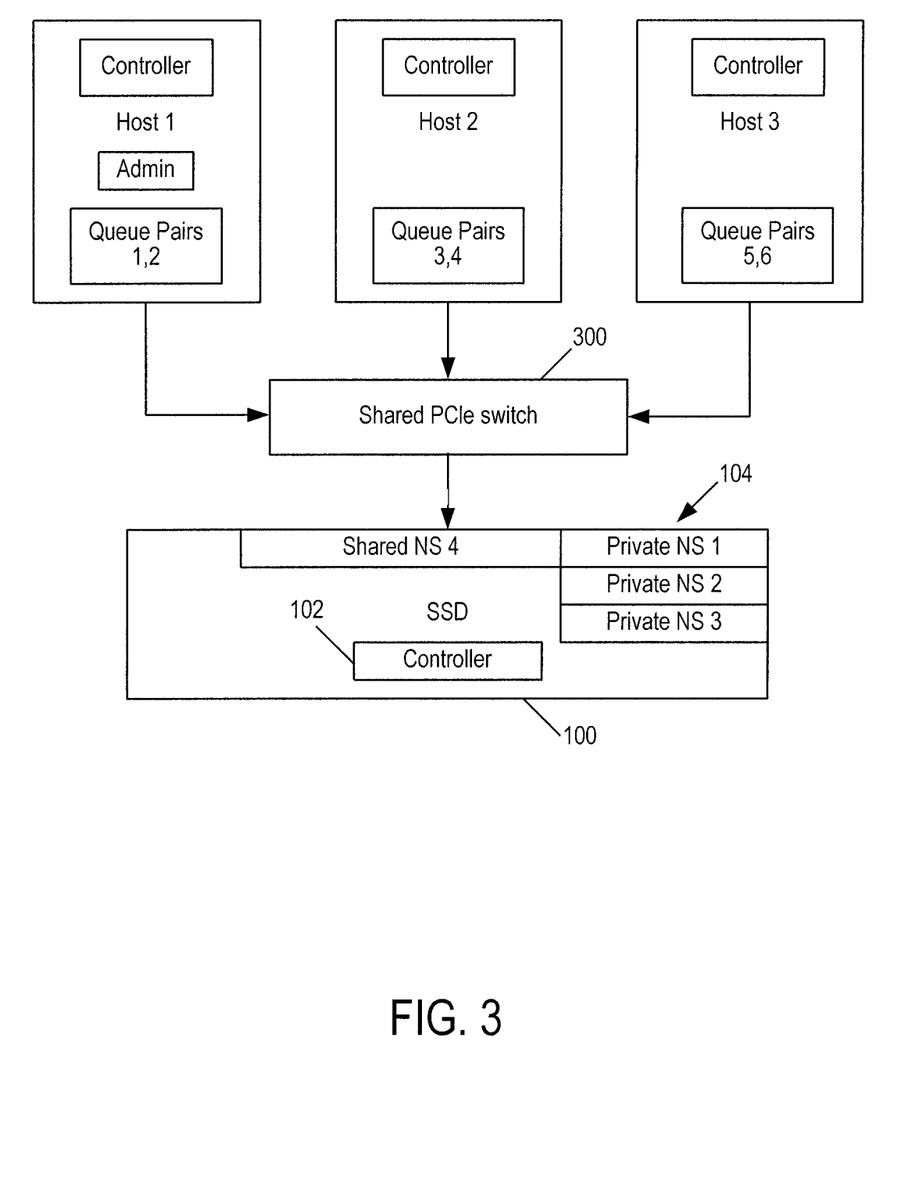
FIG. 3 is a block diagram of system of an embodiment having three hosts in communication with a storage system via a switch.

Turning again to the drawings, FIG. 3 is a block diagram of system of an embodiment having three hosts (Host 1, Host 2, and Host 3) in communication with a storage system 100 (here, a solid state drive (SSD)) via a shared PCIe switch 300. In this example, the PCIe switch 300 supports transparent bridging using address translation or non-transparent bridging with memory mapping and message signaled signal interrupt (MSI)-X mapping support between the hosts. One of the hosts may be a PCIe root complex and the others may be endpoints, or they may share data using a PCIe non-transparent bridge (NTB) switch. While a PCIe-based network in an automobile is used in this example, it should be understood that other networks and environments can be used. As will be explained in more detail below, these embodiments can maintain coherency and separation of data between the private namespaces and the corresponding hosts and ensure that integrity is maintained and that hosts do not overwrite or corrupt data belonging to other hosts.

As shown in FIG. 3, each host comprises a set (i.e., one or more) of input-output queues. Specifically, in this example, Host 1 has Queue Pairs 1 and 2, Host 2 has Queue Pairs 3 and 4, and Host 3 has Queue Pairs 5 and 6. The queue pairs can be, for example, submission and completion queues. Additionally, Host 1 has an Admin Queue. Hosts 2 and 3 do not have Admin Queues and share the Admin Queue of Host 1. Each host also has a respective controller to perform various functionality. The hosts can have other components, which are not shown in FIG. 3 to simplify the drawing.

In this example, the system is operating under the NVMe protocol, although other protocols can be used. In general, NVMe uses multiple I/O queues, which are associated with individual host processor cores, in order to provide lockless communication between hosts and the storage system 100. In a shared environment with a single controller 102 in the storage system 100, multiple queues may be assigned to each of the endpoints, located in shared memory accessible to the storage system 100.

In this embodiment, it is desired for Hosts 1-3 to have their own private namespaces (Private NS 1, 2, and 3, respectively), as well as access to a shared namespace (Shared NS 4) in the memory 104. However, the standard NVMe specification assumes a one-to-one correspondence between hosts and storage system controllers, therefore providing a gap in support for use cases where multiple hosts share the same storage system.

To address this, in this embodiment, the storage system 100 receives a queue-to-namespace mapping via a modification to the Namespace Attach command. In this modification, the Admin Queue in Host 1 can attach a namespace list to a specific queue by utilizing a vendor-specific extension of the command (e.g., CDW11). If a namespace is not attached to a specific queue, I/O commands addressing that namespace will fail. In this way, the storage system 100 can restrict access to the portions of the memory 104 based on the association/mapping.

Namespaces shared among hosts can be arbitrated using the Reservation protocol in NVMe. Reservations are primarily used to arbitrate between multiple controllers but, in this embodiment, are used by a single controller with multiple hosts to define which queues can access a shared namespace. Since only Host 1 can submit commands to the Admin Queue, host identification registration can be submitted from the other hosts using a vendor-specific I/O command, following the same semantics as host identification registration in the Admin Queue. Reservations themselves are I/O commands, but they apply to the submitting host rather than just to the queue that they were sent in. In fact, the same reservation applies to multiple controllers, as long as they use the same Host ID, but, in this embodiment, there is one controller shared by multiple hosts, so a change is needed to the way a queue is associated with a specific host. Alternatively, a shared Admin Queue multiplexing approach described later in this document can be used. If multiplexing is used, a modification to the host identifier scheme can be used in order to allow host identification using command identifier (CID) prefixes or other differentiation methods as described below.

Figure 4:
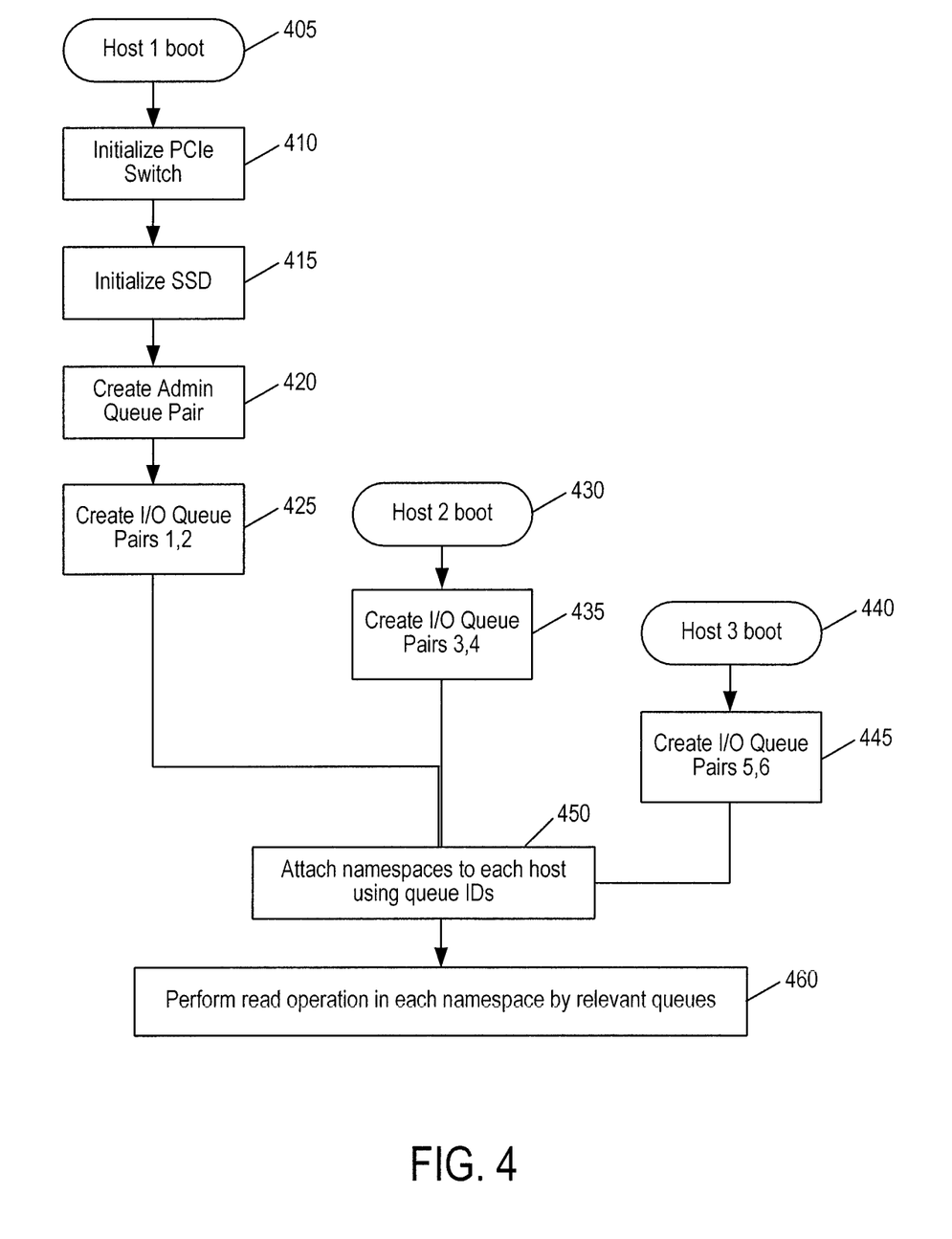
FIG. 4 is a flowchart of a method for namespace reservation in a multi-queue single-controller environment of an embodiment.

FIG. 4 is a flowchart 400 of a method for namespace reservation in a multi-queue single-controller environment of an embodiment. This flowchart 400 shows a provisioning sequence during host initialization. As shown in FIG. 4, after Host 1 boots (act 405), Host 1 initializes the PCIe switch 300 (act 410) and initializes the storage system 100 (act 415). Next, Host 1 creates the Admin Queue pair (acts 420) and I/O Queue Pairs 1 and 2 (act 435) in its memory (e.g., RAM). Hosts 2 and 3 also boots up and create their respective queue pairs (acts 430, 435, 440, and 445) in their memories. Then, Host 1 attaches namespaces to each host using the queue identifiers (act 450). After that, the storage system 100 can perform a read operation in each namespace using the relevant queues (act 460), thereby restricting access to the portions of the memory 104 based on the association/mapping.

Host 1 can receive queue identifiers to create the association between the queues and the namespaces in any suitable way. For example, submission of admin commands from Hosts 2 and 3 to Host 1 can be done by using an out-of-band command protocol between the hosts or via the PCIe fabric, without relation to the storage system 100. Methods can include a socket-based communications protocol, a shared memory area, or a hardware interconnect, for example. In one example, commands submitted to the Admin Queue in Host 1 from Host 2 or 3 can be differentiated by subdividing the command identification (CID) field in the command to include a prefix that identifies the originating host. This is illustrated in the flowchart 500 in FIG. 5.

Figure 5:
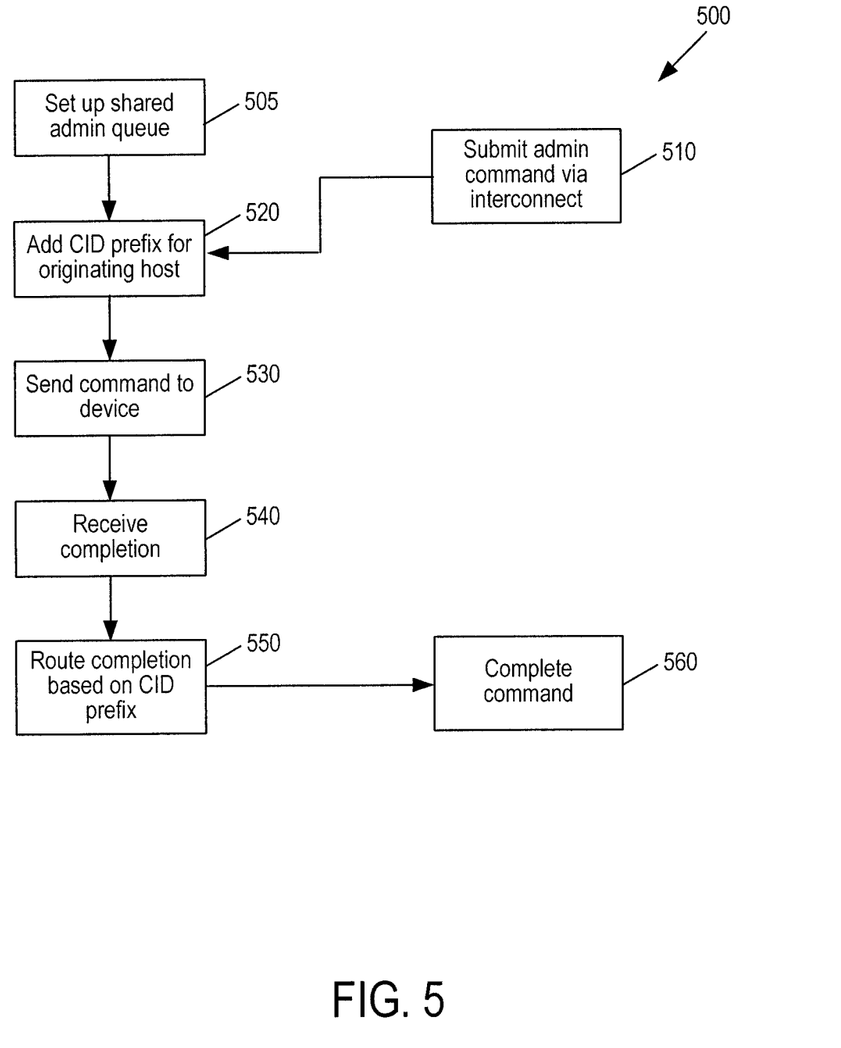
FIG. 5 is a flow chart of a method of an embodiment for using a command identifier for namespace reservation in a multi-queue single-controller environment.

As shown in FIG. 5, Host 1 sets up its Admin Queue (act 505). Next, Host 2 sends an admin command to Host 1 (e.g., via an interconnect between the two hosts) (act 510). Host 1 then adds the CID prefix for the originating host (act 520) and sends the command to the storage system 100 (act 530). After receiving a completion message from the storage system 100 (act 540), Host 1 routes the completion to Host 2 based on the CID prefix (act 550), and Host 2 receives an indication that the command has been completed (act 560).

There are several advantages associated with these embodiments. For example, these embodiments can be used to extend virtualization techniques to a multi-host environment without requiring a fully-virtualized controller interface, thereby allowing the use of reservations in a single-controller system with multiple hosts. This can be done, for example, by virtualizing a shared admin queue using CID prefixes or other identifying information. While the association/mapping can be done by the Admin Queue, the reservations can be made via the I/O queues. With these embodiments, a relatively low-cost controller and storage system setup can be deployed to multiple hosts. This can provide an advantage in automotive and adjacent markets, where high cost can prevent the use of conventional enterprise multi-host SSD architectures.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for access control in a memory, the method comprising:
    performing the following in a storage system comprising a memory and a controller in communication with a plurality of hosts, wherein each host comprises its own set of input-output queues but only one host comprises an admin queue and the admin queue is shared by other hosts of the plurality of hosts, and wherein the admin queue is configured to generate a mapping that associates portions of the memory to identifiers of the sets of input-output queues in the other hosts of the plurality of hosts;

receiving the mapping from the admin queue; and restricting access to the respective portions of the memory based on the mapping, wherein a host is allowed access to a portion of the memory only if the identifier of the host's set of input-output queues is associated with the portion of the memory in the mapping.

2. The method of claim 1, wherein the mapping is received via one of the plurality of hosts that does not comprise the admin queue.

3. The method of claim 1, wherein the mapping is based on command identifiers of the plurality of hosts.

4. The method of claim 1, wherein the mapping is received via the host that comprises the admin queue.

5. The method of claim 1, wherein the memory comprises a three-dimensional memory.

6. The method of claim 1, wherein the memory further comprises a portion that is accessible by the plurality of hosts.

7. The method of claim 1, wherein the storage system comprises a solid state drive (SSD).

8. The method of claim 1, wherein the storage system and the plurality of hosts are part of an automobile.

9. A system comprising:
a first host comprising a first set of input-output queues and an admin queue;
a second host comprising a second set of input-output queues but not an admin queue, wherein the second host shares the admin queue of the first host;
a storage system comprising a controller and a memory; and
a switch configured to allow communication between the first host, the second host, and the storage system;
wherein the first host is configured to use the admin queue to:
create a first association between the first set of input-output queues and a first namespace in the memory, wherein the first association associates the first namespace with an identifier of the first set of input-output queues or a command identifier of the first host; and
create a second association between the second set of input-output queues and a second namespace in the memory, wherein the second association associates the second namespace with an identifier of the second set of input-output queues or a command identifier of the second host;
wherein the controller of the storage system is configured to restrict access to the first and second namespaces in the memory to the first and second hosts, respectively, based on the first and second associations.

10. The system of claim 9, wherein the first and second associations are sent to the storage system from one of the first and second set of input-output queues.

11. The system of claim 9, wherein the memory comprises a three-dimensional memory.

12. The system of claim 9, wherein the memory further comprises a namespace that is shared by the first and second hosts.

13. The system of claim 9, wherein the storage system comprises a solid state drive (SSD).

14. The system of claim 9, wherein the storage system and the first and second hosts are part of an automobile.

15. A host comprising:
a first set of input-output queues;
an admin queue shared by the host and a second host;
an interface through which to communicate with a storage system comprising a controller and a memory and with the second host comprising a second set of input-output queues, wherein the second host shares the admin queue of the host; and
means for creating a first association between the first set of input-output queues and a first namespace in the memory and a second association between the second set of input-output queues and a second namespace in the memory, wherein the first association associates a first namespace with an identifier of the first set of input-output queues or a command identifier of the host, and wherein the second association associates a second namespace with an identifier of the second set of input-output queues or a command identifier of the second host;
wherein the controller of the storage system is configured to restrict access to the first and second namespaces to the first and second hosts, respectively, based on the first and second associations.

16. The host of claim 15, wherein the memory comprises a three-dimensional memory.

17. The host of claim 15, wherein the storage system comprises a solid state drive (SSD).

18. The host of claim 15, wherein the host is part of an automobile.

* * * * *